Figure 1:
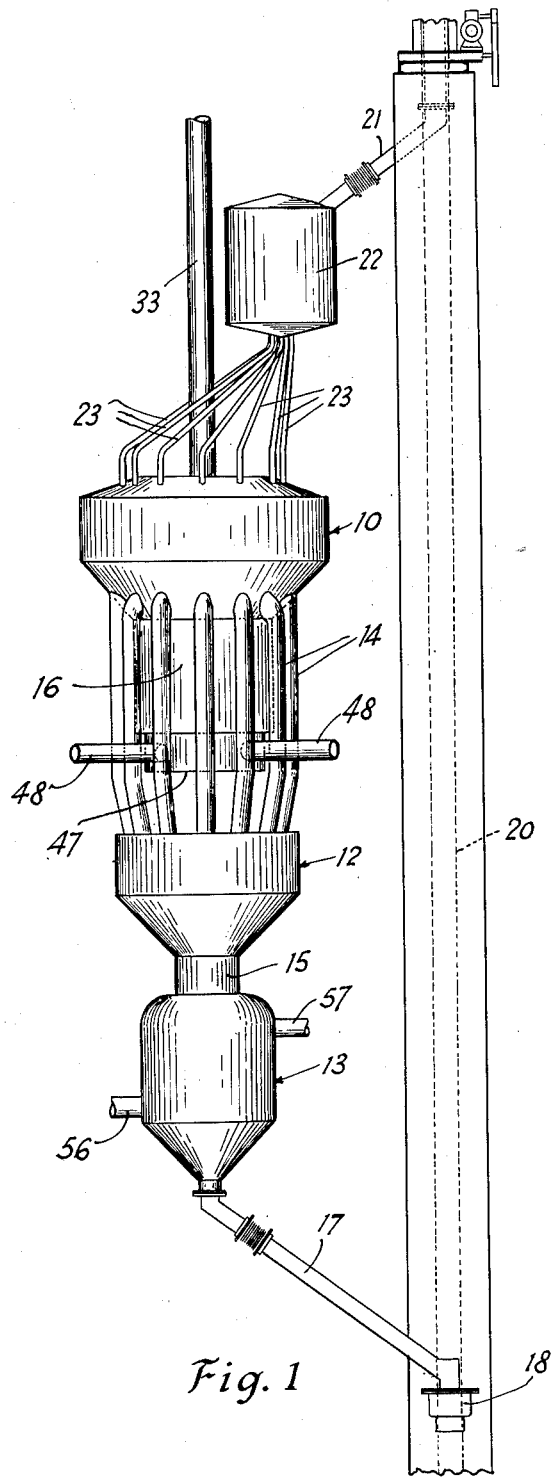

Jan. 27, 1953 P. R. GROSSMAN 2,626,794
FLUID HEATING SYSTEM
Filed May 29, 1948 2 SHEETS—SHEET 2

INVENTOR
Paul R. Grossman
BY
J P Moran
ATTORNEY

Patented Jan. 27, 1953

2,626,794

UNITED STATES PATENT OFFICE 2,626,794

FLUID HEATING SYSTEM

Paul R. Grossman, Irvington, N. J., assignor to The Babcock & Wilcox Company, New York, N. Y., a corporation of New Jersey Application May 29, 1948, Serial No. 30,022

5 Claims. (Cl. 263—19)

The present invention relates to the construction and operation of fluid heaters of the moving bed type in which a fluent mass of solid heat transfer material is circulated downwardly through a heating chamber, in which it is heated by the passage of a gaseous heating fluid in direct contact heat transfer relation therewith. The heated bed of fluent solid material is thereafter continuously circulated through one or more subjacent cooling chambers, in which it is cooled by direct contact heat transfer with one or more separate fluid streams to be heated. This general type of fluid heating apparatus is disclosed and claimed in a co-pending application of mine filed March 20, 1947, Serial No. 735,978.

Fluid heaters of the type described usually employ small pieces or bodies of ceramic refractory materials, arranged in a fluent mass or bed, as the heat transfer medium and are capable of being continuously operated over extended periods of time at substantially higher temperatures than are permissible, or economically possible, with metallic heat exchangers. To obtain the most desirable heating conditions in the apparatus, contact between the solid heat transfer material and a fluid in the separate heat transfer zones must be such as to result in substantially uniform temperatures transversely of the moving streams of both the solids and the fluid. This will avoid localized overheating, which is detrimental to many heat transfer processes. To attain such uniform temperatures is primarily a problem of fluid distribution in its contact with the moving mass of solids, and of maintaining a substantially uniformly distributed and continuous movement of the solids through the fluid-solid contact zones. Such a problem is particularly difficult in the solid heat transfer material heating zone due to high temperatures prevailing therein. High temperatures necessitate the use of refractory materials to define the flow paths of the heating fluid and it is advantageous to avoid or minimize structural loads on the refractory materials. The fluid and solid material flow distribution problem is further accentuated in high capacity fluid heaters. It will be understood that an increase in the heater capacity necessitates an increase in the volume of heating fluid flow and an increase in the cross-sectional area of solid heat transfer material. The depth of solid material bed is a function of the desired temperature of the solid material delivered from the heating zone, and ordinarily, will not be essentially altered in the design of fluid heaters for various specific capacities for the same general heating temperature requirements.

The main object of the present invention is to provide fluid heating apparatus of the type described which is characterized by its high heat transfer capacity and its ability to heat fluids continuously to a substantially uniform high temperature. A further and more specific object is to provide apparatus for the continuous heat exchange contact of a fluid with a large mass of moving solid heat transfer material in a plurality of zones under substantially identical heat exchange conditions for essentially uniform temperatures transversely of the moving mass of solid material. A further specific object is to provide apparatus for heating a large mass of moving solid heat transfer material to a high temperature in a plurality of heating zones by direct contact with a heating fluid and to combine the moving mass of heated solid material in a subjacent chamber under temperature equalizing conditions for subsequent withdrawal at a substantially uniform temperature transversely of the moving mass. A further object is to provide means for heating a mass of moving heat transfer material to a high temperature, with the heated heat transfer material delivered at a substantially uniform controlled temperature transversely of its mass to a subjacent chamber for heat exchange with a separate fluid to be heated. An additional specific object is to provide apparatus of the type described which is economical in construction and in operation and is capable of high temperature operation over extended periods.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a practical embodiment of my invention.

Figure 2:
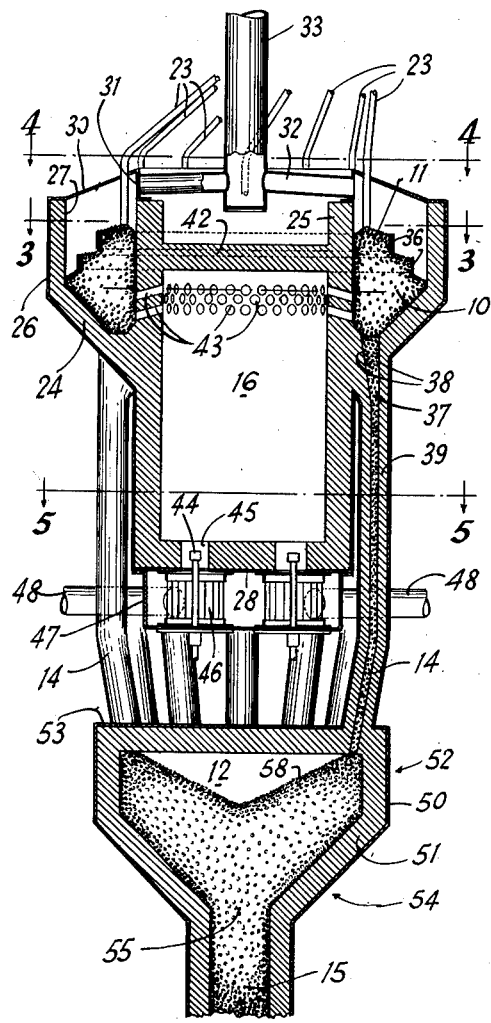
Figure 3:
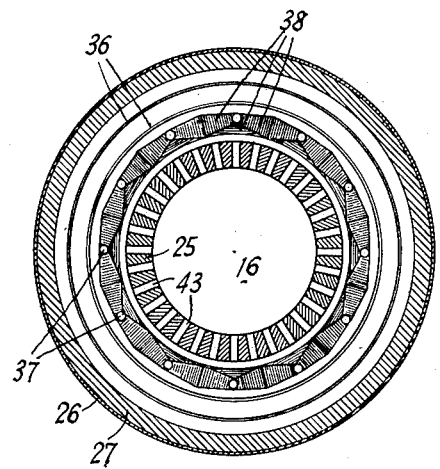
Figure 4:
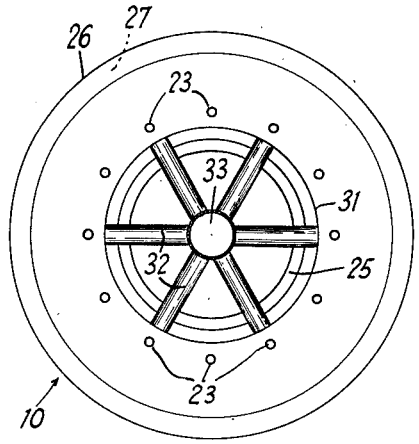
Figure 5:
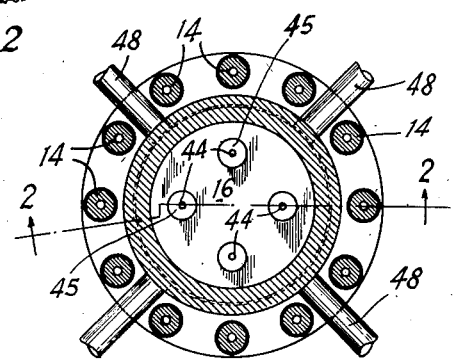

Of the drawings:

Fig. 1 is an elevation of a fluid heating apparatus constructed in accordance with the present invention;

Fig. 2 is an enlarged elevation, in section, of a portion of the apparatus shown in Fig. 1; and Figs. 3, 4 and 5 are sectional views taken along the lines 3—3, 4—4 and 5—5, respectively, of Fig. 2.

While various features of my improved apparatus are adapted for use in any high temperature fluid-solid contact apparatus, the apparatus described herein is especially useful in the continuous heating of a moving mass of fluent solid material to a high temperature by direct contact heat exchange with a heating fluid.

In general, as shown in Fig. 1, the fluid heater includes an upper heating chamber 10, wherein a fluent mass or bed of solid heat transfer material or pellets 11 is heated by direct contact with a heating fluid, an intermediate heat equalization chamber 12, and a lower fluid heating chamber 13. The chambers 10 and 12 are connected by a plurality of tubes or throat conduits 14 of substantially reduced cross-sectional area which are circumferentially equally spaced about the common vertical axis of the chambers and form a plurality of passageways for the movement of the pellets 11 downwardly therethrough. The chambers 12 and 13 are connected by a tubular conduit 15 which is also of reduced cross-sectional area and forms a passageway for the movement of the pellets 11 downwardly into the fluid heating chamber 13.

In the illustrated embodiment of the invention, the heating fluid for heating the pellets 11 in the chamber 10 consists of gaseous products of combustion produced in a combustion chamber 16 located centrally of the chamber 10 and directed into heating contact with substantially uniform circumferential and longitudinal flow into and through the downwardly moving annular bed of pellets maintained within the chamber 10. The pellets are heated to a generally uniform high temperature within the chamber 10 and in discharging through the throats 14, chamber 12 and conduit 15 into the chamber 13 will be at a substantially uniform temperature transversely of their direction of flow. A separate fluid is heated within the chamber 13 by direct contact heat exchange with the pellets 11, which are cooled thereby and discharged through a tube or spout 17 to a feeder 18. The feeder 18 is of a suitable mechanical type arranged to regulate the withdrawal of pellets through the spout and thus, the rate of pellet flow through the fluid heating apparatus. The pellets are discharged by the feeder into the loading boot of a continuous bucket elevator 20, or other elevating or conveying means, which delivers the pellets through a discharge spout 21 into a surge bin 22 located above the chamber 10. A plurality of feed pipes 23 direct the gravitational movement of the pellets from the bottom of the bin 22 to circumferentially spaced positions within the upper portion of the chamber 10 for reuse in the heat exchange process.

The illustrated arrangement of apparatus is particularly designed for high capacity heating of a continuously moving mass of heat transfer material to an exceptional uniform temperature prior to its heat exchange contact with a fluid to be heated. A uniform material temperature is essential in the short contact time heating of some fluids, such as hydrocarbons, wherein overheating or underheating of a portion or portions of the heated fluid is detrimental to the process. The intermediate chamber 12 is especially useful in equalizing the temperature of the heat transfer material pellets, as hereinafter described. In processes permitting a slightly lesser uniformity of heat transfer material temperatures the chamber 12 may be omitted and the throat conduits 14 can be arranged to discharge hot pellets directly into the chamber 13. The chamber 13 may be constructed as shown in my co-pending application, or in a manner similar to the hereinafter described construction of chamber 10. It will also be apparent that other chambers may be arranged in superposed positions beneath the chamber 13, as disclosed in my prior application.

A relatively wire range of refractory material can be used in forming the heat transfer pellets 11, the material selected depending upon the particular operating conditions to be maintained within the fluid heating unit. In general, the material should have a high strength and hardness, substantial resistance to thermal shock, and a high softening temperature. Such materials may be natural or manufactured ceramic refractories, corrosion resistant alloys or alloy steels, in small pieces of regular or irregular shape. Substantially spherical pellets of manufactured ceramic refractories have been successfully used. The pellets should be of a size such as to provide a large surface area for transfer of heat in the beds and of a density sufficient to withstand a high fluid flow velocity through the pellet mass without lifting. One desirable size of ceramic refractory pellet has been found to be approximately $\frac{5}{16}$ inch in diameter, but the size may be varied above and below that value, depending upon the desired operating conditions in the fluid heater.

As shown in Figs. 2 to 5 inclusive, the pellet heating chamber 10 is constructed as an annulus with its inner wall 25 formed of refractory materials and common with the wall defining the upper end portion of the cylindrical combustion chamber 16. The outer wall of the annular heating chamber consists of a metallic shell 26 protected by a lining 27 of high temperature refractory material and extends downwardly from the elevation of the upper end of the wall 25 to a spaced lower position. Thereafter the shell and its lining are shaped as an inverted truncated cone merging with respect to the wall 25 to form a sloping bottom 24 for the annular chamber 10. The shell 26 is extended downwardly below the bottom of the chamber 10 as a cylinder to enclose the lower side wall portions of the combustion chamber 16, and to join a horizontally disposed plate 28.

The top of the chamber 10 is closed by a frusto-conical metal plate 30 which is attached on its outer periphery to the upper end of the shell 26 and on its inner edge to an upstanding metallic flange or collar 31 supported on the upper end of the wall 25. The plate 30 is provided with a circular series of equally spaced inlet openings to accommodate the heat transfer material spouts 23 which project therethrough into the upper portion of the chamber 10. A circular series of equally spaced gas outlet openings are provided in the collar 31 and are each in communication with a gas outlet duct 32 leading to a centrally disposed, vertically extending stack 33.

As shown in Figs. 2 and 3, a coaxial series of heat transfer material dams 36 are installed in the upper part of the chamber 10 to control the natural contour of the upper surface of the pellet bed within the heating chamber. Since these dams are installed at a relatively cool location within the chamber, i. e., at the heating gas outlet side of the pellet bed, the dams are made of alloy metal and may be supported by alloy metal straps or hangers (not shown). Advantageously, the dams are coaxial with the wall 25 and are arranged in outwardly and downwardly spaced steps from a position radially spaced from the lower end of the spouts 23 so as to maintain the lineal dimension substantially equal from the heating fluid inlet ports, as hereinafter described, to the free space above the pellet bed. This arrangement tends to equalize the flow path of the heating gas through the bed, so as to obtain a desirably uniform distribution of heating gas flow therethrough.

The bottom of the annular chamber 10 is provided with a plurality of circumferentially equally spaced pellet outlet passageways 37 opening into the throat conduits 14. Each of the passageways is formed in the refractory lining of the chamber bottom 24 and the upper end of the refractory material enclosing the throat conduit 14. Each passageway is of generally hopper shape with converging walls 38 merging into the upper open end of the pellet passageway of the corresponding throat conduit 14. Since the outlet passageways 37 are equally spaced in a ring adjacent the bottom of the chamber 10, and are each of similar shape and size, each of the throat conduits 14 provides a discharge flow passageway for pellets from an equal segment or zone of the annular chamber 10. With equal zones of the chamber 10 served by each throat passageway, the height of pellets maintained over each throat should also be uniform to insure an equal distribution of heating fluid or gases to each zone. In the construction illustrated the number of spouts 23 corresponds with the number of throat conduits 14 and the discharge end of each spout lies in a common horizontal plane and is generally in vertical alignment with a corresponding throat conduit 14.

The throat conduits 14 are circular in section and are defined by refractory walls 39 extending from their upper connection with the passageway 37 to a lower connection, opening into the chamber 12. The refractory walls 39 of each throat are encased in an individual metallic casing which is welded at opposite ends to the casings of the chambers 10 and 12 so as to provide a gas-tight closure for the pellet flow paths. In the illustrated embodiment of the invention, both of the chambers 10 and 12 are located on a common vertical axis about which the throat conduits are symmetrically arranged. The throat passageways are longitudinally elongated to provide adequate clearance above the chamber 12 for the installation and operation of the fuel burning equipment associated with the combustion chamber 16. As shown, the chamber 12 has an outer diameter slightly less than the outer diameter of the annular chamber 10 thereby necessitating an inward inclination to the lower end portions of the throat conduits 14 in their connections with the chamber 12. It is apparent that the lower outlet ends of the throats 14 may be symmetrically arranged in a circle of any desired diameter to discharge into a subjacent chamber or receptacle, providing the inclination of the throat passageways is sufficient for the flow of pellets therethrough.

The combustion chamber 16 is provided with a refractory top 42 which is spaced downwardly from the upper end of the wall 25. Beneath the top 42, the wall 25 is provided with a plurality of port openings 43 therethrough for the movement of heating gases from the chamber 16 into the chamber 10. The ports are circumferentially equally spaced in a plurality of vertically spaced horizontal rows, and are each downwardly inclined outwardly of the combustion chamber to open into the chamber 10 at elevations opposite the inclined bottom portion of the chamber. With the port opening arrangement described, the heating gases from the combustion chamber 16 are substantially uniformly circumferentially distributed in their contact with the pellets. As a result each equal segment or heating zone of the pellet mass within the chamber 10 receives an equal portion of the heating gases.

A group of four fuel burners 44 are disposed in burner port openings 45 in the bottom of the combustion chamber. The burners are symmetrically arranged about the axis of the chamber, and as shown, are arranged to project a combustible mixture of fuel oil and air upwardly into the combustion space of the chamber 16. Exteriorly of the plate 28, the burners 44 and their individual air registers 46 are enclosed in an airtight housing 47 which is provided with high pressure air delivered thereto through the air supply ducts 48 from a plurality of blowers (not shown). Thus the fuel delivered by the burners 44 is burned within the chamber 16 with the gaseous products of combustion passing therefrom through the port openings 43 into the chamber 10.

The chamber 12 is enclosed by a metallic shell 50 protected by an internal refractory lining 51, and is shaped to form an upper cylindrical portion 52 having a substantially flat cover 53 and a lower inverted frusto-conical portion 54. The bottom of the portion 54 ends in a centrally positioned outlet opening 55 corresponding with the upper end of the throat 15. The upper portion of the chamber is constructed with a cross-sectional area larger than the area of the annular chamber 10 so as to provide a reduced rate of movement of the pellets through the chamber. The retention of the pellets within the chamber 12 insures a generally uniform temperature transversely of the pellet mass due to heat interchange between pellets. As a result the pellets will be delivered into the chamber 13 at an essentially uniform temperature, which will advantageously permit close control of, for example, a hydrocarbon cracking process or other process necessitating a high degree of temperature uniformity in the heated fluid.

The arrangement of the lower ends of the throats 14 within the chamber 12 will determine the uniformity of the pellet withdrawal from the zones of the annular heating chamber 10, and thus will influence the degree of temperature uniformity of the pellets discharged through the throat conduits 14. As shown in Fig. 2, the lower ends of the conduits 14 are equally spaced in a circle which is coaxial with the vertical axis of the outlet 55 and the chamber 12. Moreover the ends of the throats lie in a common horizontal plane which, as illustrated, corresponds with the lower surface of the cover 53. With this construction each throat conduit 14 receives pellets from equal segments or zones of the chamber 10 and likewise discharges pellets into equal segments of the chamber 12. Such an arrangement insures an equal pellet withdrawal rate through each of the conduits and through each of the pellet heating zones. Although, in the construction illustrated, the throat conduits 14 are symmetrically arranged about the common vertical axis of the chambers 10 and 12, so that the frictional resistance to pellet flow through each is essentially the same, it will be understood that a variation in pellet friction by reason of a difference in the length of individual conduits will not adversely affect, to any substantial extent, the uniformity of pellet flow into the chamber 12. This is due to the flow controlling effect of the pellet distribution within the chamber 12, wherein the pellet delivery is made to equal segments of the chamber.

It will be appreciated that the principal pellet flow controlling factor in the chamber 12 is the symmetrical arrangement of the lower discharge ends of the throat conduits 14 with respect to the vertical axis of the chamber outlet 55. With such an arrangement the pellet withdrawal rate from each throat conduit will be equal to the flow rate from every other conduit. Furthermore, in the substantially equal pellet flow from each heating zone in the chamber 10 and substantially equal heating gas flow to each zone, the resulting temperature of the pellets delivered to the chamber 12 will likewise be substantially equal in each segment of the chamber 12.

The lower chamber 13, as shown in Fig. 1, is arranged to receive the hot pellets delivered thereto through the conduit 15, and to cool those pellets by direct contact heat exchange with the fluid to be heated. The fluid is introduced through a supply pipe 56, passed through the chamber 13 in countercurrent flow relationship with the hot pellets therein, and thence discharged through a duct 57 to a point of use (not shown) for further processing or storage. The chamber 13 may be constructed in a manner similar to the hereinbefore described upper heating chamber 10, or as shown in my co-pending application.

In operation, the pellets are circulated through the apparatus at a controlled rate as determined by the feeder 18, so that they are maintained in a fluent mass extending from a position intermediate the height of the surge bin 22 to the feeder 18. The pellets in moving from the surge bin 22 through the spouts 23 are distributed circumferentially of the chamber 10 and the circular dams 36 determine the contour of the upper pellet surface therein. The heating gas generated in the chamber 16 is substantially circumferentially uniformly distributed in passing through the interstices of the pellet bed in the chamber 10 due to the substantially equal length of gas flow paths through the bed and the uniformity of heating gas pressures on the opposite sides of the pellet bed. It will be noted, however, that the pellet temperatures radially of the annular bed will vary to some extent due to the tendency for the pellets closest to the gas entrance ports 43 to absorb high temperature heat, cooling the heating gas, so that pellets adjacent the outer wall of the chamber 10 will be discharged at a somewhat lower temperature. The temperature variation of pellets discharged through each of the throats 14 may be in the range of 25° F. to 50° F., at an average temperature of 2700° to 2800° F. by reason of the described heating characteristics. This temperature variation will tend to be reduced during the passage of the pellets through the throat conduits 14, but such a variation is detrimental to certain fluid heating processes and can be avoided in the apparatus described.

The pellets discharging into the chamber 12 will form an upper inverted frusto-conical surface 58 therein according to their natural angle of repose, with a portion of the pellets discharging from each conduit 14 moving toward the center of the chamber. This action of the pellets encourages a thorough mixing of the pellets which is continued in the movement of the pellets to and through the throat passage 15. Due to the slow movement of the pellets in passing through the chamber 12, sufficient time is provided to attain a high degree of temperature uniformity throughout any horizontal section of the mass due to the interchange of heat between pellets. As a result, the pellets entering the chamber 13 will advantageously be at an essentially uniform temperature transversely of their flow for heating a fluid in direct contact therewith.

It will be noted that the present invention provides apparatus for heating a large mass of moving heat transfer material to an exceptionally uniform temperature in a compact and economically operated unit. The symmetrical arrangement of pellet flow paths and heating gas flow paths contribute to the efficient functioning of the unit in a structural arrangement whereby the refractory materials defining the flow paths are not subjected to high temperatures when supporting the weight of the moving pellet mass.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. Heat transfer apparatus comprising walls defining a chamber having inlet opening for a gas-pervious mass of fluent heat transfer material and at least one fluid outlet opening in the upper portion thereof, one of said walls converging toward an upright wall in the lower portion of said chamber defining the bottom thereof and having at least one tapered outlet opening therein for said fluent heat transfer material, a fluid supply duct arranged for the introduction of a fluid through the upright wall and into the lower portion of said chamber for upward flow therethrough toward said fluid outlet, and dams arranged in the upper portion of said chamber to alter the contour of the upper surface of the heat transfer material to equalize the fluid flow path through the gas-pervious mass within said chamber.

2. Heat transfer apparatus for direct contact heat exchange between a downwardly moving mass of fluent gas-pervious solid heat transfer material and a fluid comprising a plurality of fluid-solid material contact zones, each zone having an outlet opening in the bottom thereof for the discharge of fluent solid material, means for causing a flow of fluid upwardly through the interstices of the moving mass of solid material maintained in said zones, wall defining a generally cylindrical chamber beneath said zones and having an outlet opening in the bottom thereof for the discharge of fluent solid material, a plurality of throat tubes connecting the mass of fluent solid material in said zones with the upper portion of said chamber, each of said throat tubes having its upper end connected with the outlet opening of one of said zones, the lower ends of said tubes circumferentially equally spaced in a ring coaxial with the vertical axis of said chamber outlet and opening into said chamber in a common horizontal plane, and means for continuously moving said fluent solid material downwardly through said zones, throats and chamber.

3. Heat transfer apparatus for direct contact heat exchange between a downwardly moving mass of fluent gas-pervious solid heat transfer material and a gaseous heating fluid comprising a plurality of solid material heating zones of equal material heating capacity, each zone having an outlet opening in the bottom thereof for the discharge of heated solid material, means for causing a substantially uniformly distributed flow of heating fluid upwardly through the interstices of the moving mass of fluent solid material maintained in said heating zones, walls defining a chamber of substantially circular horizontal section beneath said heating zones and having a centrally located outlet opening in the bottom thereof for the discharge of fluent solid materials, a plurality of throat tubes connecting the beds of fluent solid material in said heating zones with the upper portion of said chamber, each of said throat tubes having its upper end connected with the outlet opening of one of said zones, the lower ends of said tubes circumferentially equally spaced in a ring coaxial with the vertical axis of said chamber outlet and opening into said chamber in a common horizontal plane for a substantially uniform withdrawal rate of solid material through each, and means for continuously moving said heated fluent solid material downwardly through said zones, throats and chamber.

4. Heat transfer apparatus comprising a cylindrical wall defining a vertically elongated closed combustion chamber having a plurality of circumferentially equally spaced heating gas outlet ports in one end portion thereof, at least one burner in the opposite end portion of said chamber arranged to deliver a combustible mixture of fuel and air thereto for the generation of a heating gas therein, a coaxially arranged radially spaced wall surrounding the gas outlet port end portion of said combustion chamber and defining an annular space therebetween, an inverted frusto-conical bottom to said annular space merging into the wall of said combustion chamber at a position spaced below said heating gas outlet ports, walls defining a plurality of circumferentially equally spaced discharge passages extending downwardly from said bottom, the converging walls of each of said discharge passages ending in an outlet opening, and means for maintaining a bed of a gas-pervious fluent solid material continuously moving downwardly through said annular space and through said outlets.

5. Heat transfer apparatus comprising coaxially arranged radially spaced walls defining an annular chamber, one of said walls being substantially upright and the opposite wall inclined to form a sloping bottom to said chamber, a plurality of circumferentially spaced inlet spouts arranged to deliver a circumferentially uniformly distributed mass of gas-pervious fluent solid heat transfer material to the upper end of said chamber, a plurality of circumferentially uniformly spaced throat passageways arranged in the bottom of said chamber, the angularity of inlet spout and throat passageway spacing being substantially equal to direct a substantially uniform withdrawal of said fluent solid material from each segment of said chamber, and means for heating said heat transfer material to a substantially uniform temperature circumferentially of said annular chamber by countercurrent direct contact heat exchange therein with a heating gas, including rows of heating gas passageways positioned in said upright wall upwardly adjacent said throat passageways and directing heating gas flow toward said sloping bottom.

PAUL R. GROSSMAN.

REFERENCES CITED

The following references are of record in the file of this patent:

UNITED STATES PATENTS

| Number | Name | Date |
| --- | --- | --- |
| 2,398,954 | Odell | Apr. 23, 1946 |
| 2,436,254 | Eastwood et al. | Feb. 17, 1948 |
| 2,445,554 | Bergstrom | July 20, 1948 |
| 2,446,805 | Bergstrom | Aug. 10, 1948 |
| 2,534,625 | Robinson | Dec. 19, 1950 |
| 2,536,436 | Goins | Jan. 2, 1951 |